United States Patent [19]

Perr et al.

[11] Patent Number: 5,033,442
[45] Date of Patent: Jul. 23, 1991

[54] FUEL INJECTOR WITH MULTIPLE VARIABLE TIMING

[75] Inventors: Julius P. Perr; George L. Muntean, both of Columbus, Ind.

[73] Assignee: Cummins Engine Company, Inc., Columbus, Ind.

[21] Appl. No.: 298,913

[22] Filed: Jan. 19, 1989

[51] Int. Cl.$^5$ .............................. F02M 39/00
[52] U.S. Cl. .................... 123/502; 123/501; 123/446; 239/95
[58] Field of Search ............. 123/502, 501, 500, 446, 123/447; 239/88-95, 125, 533.2-533.12

[56] References Cited

U.S. PATENT DOCUMENTS

| | | |
|---|---|---|
| 2,863,438 | 12/1958 | Challis . |
| 2,997,994 | 8/1961 | Falberg . |
| 3,035,523 | 5/1962 | Kemp et al. . |
| 3,083,912 | 4/1963 | Shallenberg . |
| 3,544,008 | 12/1970 | Reiners et al. . |
| 3,557,651 | 1/1971 | Nystron . |
| 3,847,510 | 11/1974 | Fenne . |
| 4,092,964 | 6/1978 | Hofer et al. . |
| 4,249,499 | 2/1981 | Perr ................................ 123/502 |
| 4,254,749 | 3/1981 | Krieg ............................... 123/502 |
| 4,281,792 | 8/1981 | Sisson ............................. 123/502 |
| 4,410,138 | 10/1983 | Peters et al. . |
| 4,419,977 | 12/1983 | Hillebrand ..................... 123/502 |
| 4,427,152 | 1/1984 | Sisson ............................. 123/502 |
| 4,463,901 | 8/1984 | Perr et al. . |

Primary Examiner—Carl Stuart Miller
Attorney, Agent, or Firm—Sixbey, Friedman, Leedom & Ferguson

[57] ABSTRACT

A fuel injector having both stepped and infinitely variable timing is disclosed. The fuel injector includes an injector housing and a plunger wherein the plunger includes an axial bore formed in the top of the plunger. A plunger top is mounted within the axial bore and is translatable between an upper position and a lower position. A coil spring having a predetermined spring rate is disposed in the axial bore for biasing the plunger top in the upper position. An upper and a lower piston are disposed above the plunger and are translatable within the injector housing. A timing chamber is formed between the upper piston and the lower piston. When the timing chamber contains timing fluid, the fluid serves as a hydraulic link between the upper and lower pistons and the fuel injector operates at a first level of advanced timing. When the timing fluid creates a force on said lower piston which is greater that the force created by the coil spring, the plunger top is pushed toward the lower position to operate the fuel injector at a second level of advanced timing. The second level of advanced timing is more advanced that the first level of advanced timing and may be infinitely variable.

21 Claims, 3 Drawing Sheets

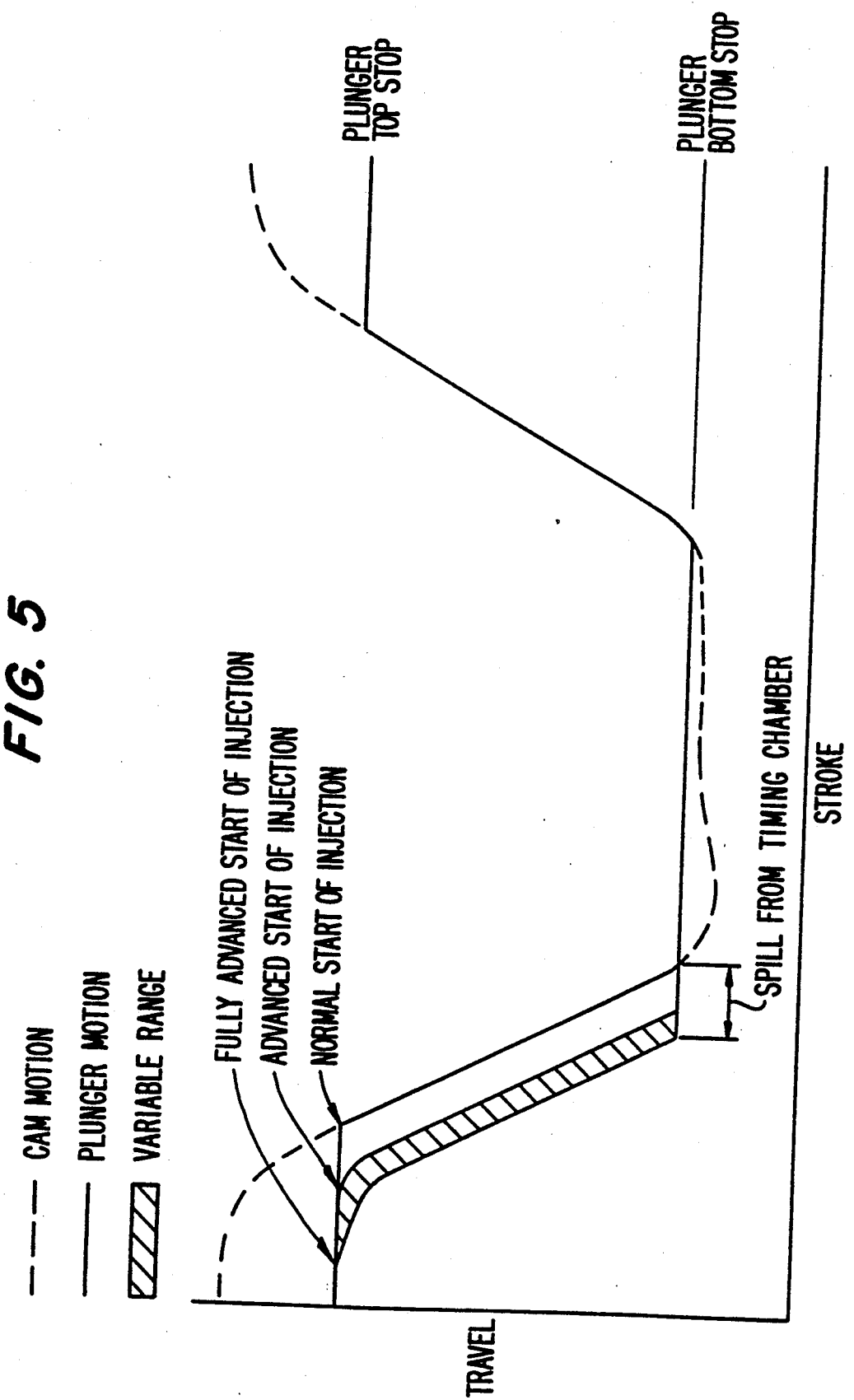

FUEL INJECTOR WITH MULTIPLE VARIABLE TIMING

TECHNICAL FIELD

The present invention relates to a fuel injector having a variable injection rate. More particularly, the present invention relates to a variable injection rate fuel injector that permits either a three-step or infinitely variable injection timing.

BACKGROUND OF THE INVENTION

Internal combustion engine designers have increasingly come to realize that substantially improved fuel supply systems are required in order to obtain higher levels of pollution abatement and increased fuel economy. Among the known options, direct fuel injection appears to be one of the best candidates for achieving improved performance but higher initial costs have tended to discourage its general adoption. This situation is accentuated because only the more sophisticated and more expensive direct injection systems are capable of achieving the increasingly higher performance goals of engine manufacturers.

Until recently, attempts to provide a low cost fuel injection system have tended to center on distributor type fuel injection systems having a single centralized high pressure pump and a distributor valve for metering and timing fuel flow from the pump to each of a plurality of injection nozzles, such as disclosed in U.S. Pat. No. 3,557,765. Although simple design concept, systems of this type generally suffer defects inherent with separation of the injector nozzles from the centralized pump. Unit injector systems avoid these inherent defects by providing each engine cylinder with its own cam-actuated pump such as disclosed in U.S. Pat. No. 3,544,008. Nevertheless, the performance advantage of unit injectors has generally not outweighed the detriment of greater costs except for heavy duty compression ignition engine applications. The design of a commercially competitive unit fuel injector therefore normally involves acceptance of some characteristics which are less than optimal since the basic goals of low cost, high performance and reliability are often in direct conflict.

Additionally, as the need for higher engine efficiency and pollution abatement have increased, it has become increasingly evident that some economical means must be provided to vary injector timing in response to changing engine operating conditions. Such control is relatively straightforward in distributor-type fuel injector systems since the injection event is controlled at one central location. However, in unit injector systems, control over injector timing ordinarily requires modification of each individual unit injector, thereby adding significantly to the overall cost of the system.

U.S. Pat. Nos. 2,997,994 and 2,863,438 provide examples of attempts to solve this dilemma by disclosing a fairly simple mechanism for achieving variable timing in unit injectors. In particular, these patents disclose the use of a collapsible hydraulic link to selectively change the effective length of the cam operated fuel injector plunger. However, the simplicity of these hydraulic timing controls is achieved only by operating the hydraulic link in either a fully expanded or fully collapsed mode. Thus, there can only be a stepped change in timing of the injection event which will not necessarily suit the broad range of conditions normally encountered during the operation of an engine. Attempts to provide for infinite variations in injection timing, even when a hydraulic link is employed, have generally involved the use of a mechanical rack which controls the size and/or the point of collapse of the hydraulic link as disclosed in U.S. Pat. Nos. 3,847,510 and 4,092,964.

Examples of techniques for providing infinite variation of unit injector timing by other means are illustrated in U.S. Pat. Nos. 3,035,523 and 3,083,912 which disclose fairly complex hydraulic arrangements for this purpose. However, in these systems the quantity injected and the change in timing are interrelated and may not be controlled independently of one another.

In U.S. Pat. No. 4,410,138 to Peters, commonly assigned to the assignee of this application, Cummins Engine Company, Inc., a fuel injector having infinitely variable timing occurring throughout the entire range of possible injection rates is disclosed. This injector uses a two part injector plunger which forms a variable length timing chamber between the upper and lower plungers and a stepped spring biasing force which resists timing chamber expansion. This injector is arranged to provide pressure and time metering of fuel or fuel cur off. U.S. Pat. No. 4,463,901, coinvented by Dr. Perr, one of the coinventors of the present invention, and commonly assigned to the assignee of the present invention, also discloses a fuel injector having infinitely variable timing advance using a variable length hydraulic link. However, neither of these injectors permits a first stepped timing advance followed by a second infinitely variable timing advance.

SUMMARY OF THE INVENTION

An important object of the present invention is to provide a fuel injector having a multiple stepped timing advance capability.

Another object of the present invention is to provide a fuel injector that is capable of variable timing including both stepped timing between certain limits and infinitely variable timing between other limits.

It is another object of the present invention to provide a fuel injector capable of variable timing in which within a first advanced timing range the injection rate is advanced by a step advance and within a second advanced timing range the injection rate is infinitely variable.

Still another object of the subject invention is to provide a unit injector having a variable hydraulic timing chamber capable of stepped increases in length between certain limits and infinitely variable length increases in length between other limits.

These and other objects are attained by the fuel injector having variable timing according to the present invention. The fuel injector includes an injector housing having an axial plunger bore with injection nozzles at one end and a plunger receiving opening at the other end. An injector plunger is translatably mounted within the axial plunger bore of the housing and is translatable between a retracted position and an inserted position. The plunger includes a plunger top axial bore formed in the top of the plunger. A plunger top is translatably mounted within the plunger top axial bore and is translatable between an upper postion in which the plunger top extends out of the plunger top axial bore and a lower disposed within the plunger top axial bore such that the top surface of the plunger top is disposed in the same plane as the top surface of the plunger. A coil spring having a predetermined spring rate is disposed in the plunger top axial bore and biases the plunger top in the upper position. A plunger biasing device for biasing the plunger in the retracted position is mounted on the injector. A lower piston is disposed above the plunger and is translatable within the injector housing and an upper piston is disposed above the lower piston and is translatable within the injector housing.

A timing chamber is formed within the injector housing between the upper piston and the lower piston. The timing chamber has a fluid inlet and a fluid outlet and includes a biasing spring to bias the upper piston apart from the lower piston. When the timing chamber is empty of timing fluid, the fuel injector operates at normal timing cycles. When the timing chamber contains timing fluid, the fluid serves as a hydraulic link between the upper and lower pistons thereby causing the injector plunger assembly to commence fuel injection at an earlier point in the injection cycle. When the timing fluid has a fluid pressure less than that created by the coil spring, the injector operates at a first level of advanced timing. When the timing fluid has fluid pressure greater than the pressure created by the coil spring, the lower piston is pushed downwardly against the plunger top to move the plunger top toward the lower position to operate the fuel injector in a second advanced timing mode. The level of timing advance in the second mode is greater than in the first mode. In one preferred embodiment, the advancement in timing of fuel injection in the second mode is infinitely variable within the range set by the upper and lower positions of the plunger top within the plunger top axial bore.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 5 is a graph comparing the plunger motion for the three modes of operation of the fuel injector of FIG. 1.

DETAILED DESCRIPTION OF THE PREFERRED EMBODIMENTS

Figure 1:
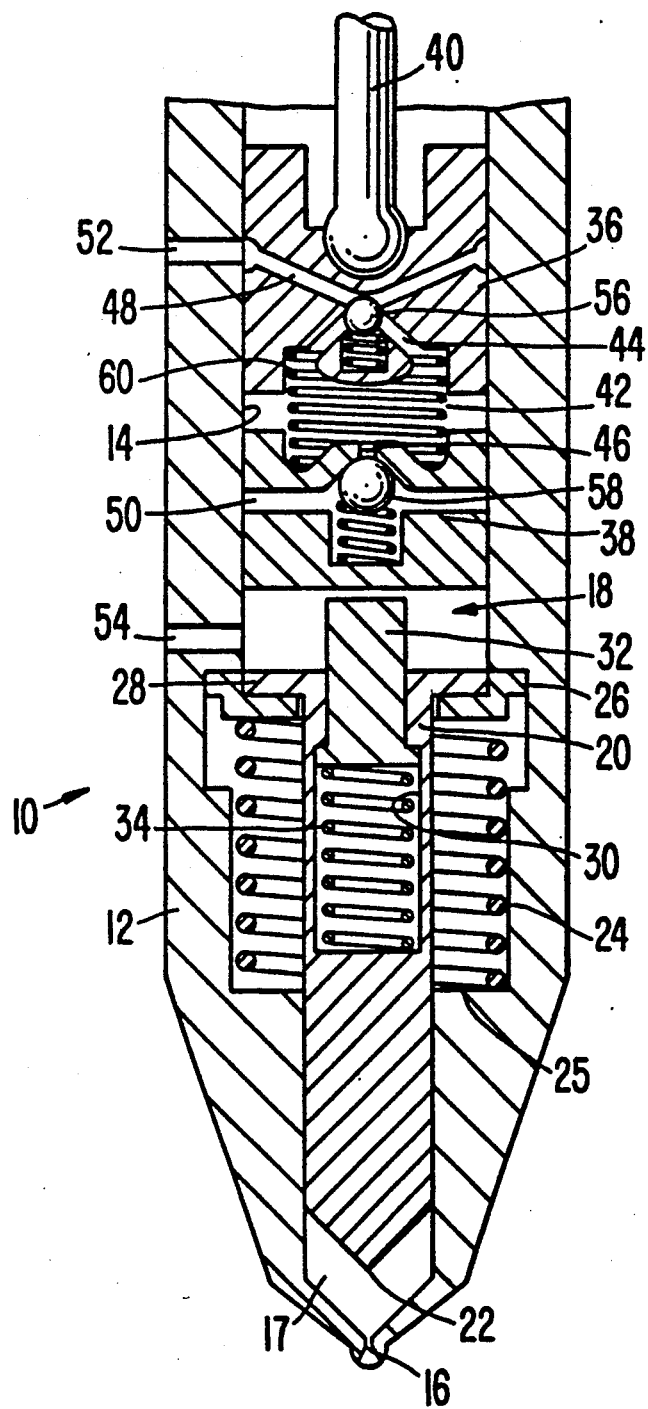
FIG. 1 is a sectional view of the fuel injector of the present invention.

As shown in FIG. 1, fuel injector 10 of the present invention includes a multi-port plunger assembly 18 which is actuated mechanically by a cam and conventional activating mechanism (not shown). Fuel injector 10 includes injector housing 12 having axial plunger bore 14 with injection nozzle 16 at one end. Injection nozzle 16 is designed to cause the lower end of axial plunger bore 14 to communicate with the interior of an engine cylinder (not shown). As will be discussed below, the lower end of bore 14 forms injection chamber 17 into which fuel is metered for injection under high pressure into the combustion chamber of the engine cylinder.

Plunger assembly 18 is translatably mounted within axial plunger bore 14. Plunger assembly 18 includes plunger 20 having plunger tip 22 formed on the end of plunger 20. Plunger tip 22 forces fuel through injection nozzle 16 when injection chamber 17 in the lower portion of axial plunger bore 14 contains fuel and plunger 20 is translated toward injection nozzle 16. Throughout this specification, "upper" and "lower" refer to the portions of the fuel injector which are farthest away from and closest to, respectively, the engine cylinder when the injector is operatively mounted on an engine. Coil spring 24 is disposed around plunger 20 within axial plunger bore 14 to bias plunger 20 in a retracted position in which plunger 20 is disposed toward the upper portion of fuel injector 10. Coil spring 24 is mounted between ledge 25 in axial plunger bore 14 at its lower end and retaining ring 26 at its upper end. Retaining ring 26 is disposed around the lower surface of plunger flange 28 formed at the top of plunger 20.

Axial bore 30 is formed in the upper portion of plunger 20. Plunger top 32 is translatably disposed in plunger top axial bore 30 and coil spring 34 is disposed in plunger top axial bore 30 to bias plunger top 32 upwardly. Plunger top 32 translates between an upper position in which it extends out of plunger top axial bore 30 and a lower position in which plunger top 32 is disposed within plunger top axial bore 30 such that the upper surface of plunger top 32 lies in the same plane as the upper surface of plunger 20.

Plunger assembly 18 also includes upper piston 36 and lower piston 38 disposed for reciprocating translational motion within axial plunger bore 14. Upper piston 36 is connected to push rod 40 which pushes upper piston 36 downwardly in accordance with the motion of the cam actuating mechanism (not illustrated). Push rod 40 is connected to and is part of the actuating mechanism. Timing chamber 42 is formed in axial plunger bore 14 between upper piston 36 and lower piston 38. Timing chamber 42 includes timing chamber fluid inlet 44 and timing chamber fluid outlet 46 which are formed at one end of upper piston passageway 48 and lower piston passageway 50, respectively. Housing 12 is also formed with timing fluid inlet 52 and timing fluid outlet 54. Upper piston passageway 48 is selectively engageable with timing fluid inlet 52 and lower piston passageway 50 is selectively engageable with timing fluid outlet 54. Spring-biased ball valve 56 is disposed in upper piston passageway 48 to control timing fluid flow therethrough, and spring biased ball valve 58 is disposed in lower piston passageway 50 to control timing fluid flow therethrough. Timing chamber coil spring 60 is disposed in timing chamber 42 between upper piston 36 and lower piston 38 to bias upper piston 36 apart from lower piston 38.

Ball valves 56, 58 serve as check valves for the timing fluid. Ball valve 56 allows the timing fluid under pressure to enter timing chamber 42. Ball valve 56 prevents back flow into timing fluid inlet 52. Once the timing fluid enters the timing chamber 42, it serves as a hydraulic link between upper piston 36 and lower piston 38. Ball valve 58 acts as a check valve to prevent timing fluid in timing fluid outlet 54 from flowing back into timing chamber 42 due to the varying back pressures in the drain line leading from timing fluid outlet 54. Ball valve 58 also serves to maintain fluid within timing chamber 42 until the timing fluid pressure reaches a level sufficient to open the valve and spill the timing fluid through lower piston passageway 50. Ball valve 58 is larger than ball valve 56 to control the larger flow rates; ball valve 58 must remain closed at higher pressures. Additionally, ball valve 58 must allow timing fluid to be spilled into timing fluid outlet 54 through timing chamber fluid outlet 46 and lower piston passageway 50 faster than fluid must enter timing chamber 42 past ball valve 56.

The operation of fuel injector 10 is best explained with reference to FIGS. 2-4. Timing fluid, such as diesel fuel, is supplied to timing chamber 42 during a timing period formed when the cam actuating mechanism causes passageway 48 of upper piston 36 to register with timing fluid inlet 52. During the timing period, fluid is supplied through timing fluid inlet 52, upper piston passageway 48, and timing chamber fluid inlet 44. Timing fluid is discharged from timing chamber 42 through timing chamber fluid outlet 46, lower piston passageway 50, and timing fluid outlet 54 when lower piston 38 is located so that lower piston passageway 50 aligns with timing fluid outlet 54. Fuel is supplied into injection chamber 17 through a fuel supply passage (not shown). Fuel is metered into injection chamber 17 when upper piston 36 is in its uppermost position as dictated by the actuating mechanism. The pistons and plunger remain in this position for a time sufficient to allow the desired amount of fuel to be metered into injection chamber 17 and also to allow the desired amount of timing fluid to enter timing chamber 42 when the fuel injector operates in its advanced timing modes. The amount of fuel entering injection chamber 17 may be metered in accordance with pressure/time or pressure only, such as explained in U.S. Pat. No. 4,463,901 to Perr et al. The amount of fuel flowing into injection chamber 17 may be controlled by varying the pressure of the fuel. Similarly, the amount of timing fluid flowing into timing chamber 42 may also be a function of pressure and time by using a throttling device.

Figure 2:
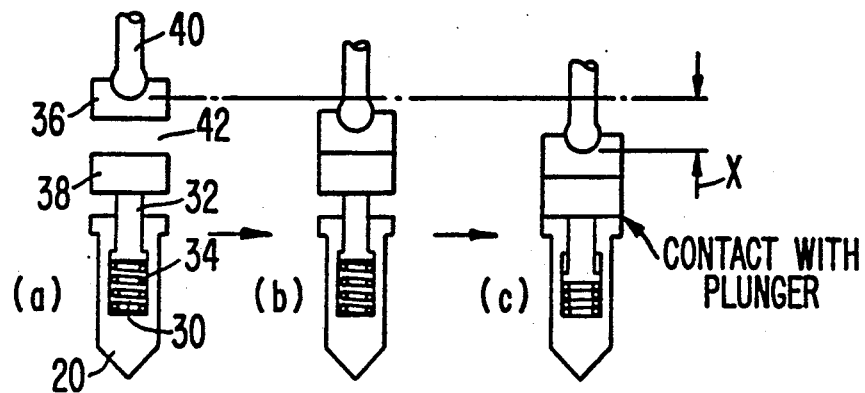
FIGS. 2a, 2b, and 2c are schematic views of the fuel injector of FIG. 1 illustrating the normal timing mode.

FIGS. 2a-2c illustrate the operation of fuel injector 10 in a normal timing mode. When the injector operates at normal timing, there is no timing fluid in timing chamber 42 as shown in FIG. 2a. During injection, push rod 40 moves upper piston 36 downwardly. Upper piston 36 travels the distance required to mechanically contact lower piston 38. This is illustrated in FIG. 2b. Lower piston 36 is substantially in mechanical contact with plunger top 32 which is biased in its upper position. Farther downward movement of push rod 40 and upper piston 36 pushes lower piston 38 against plunger top 32 until plunger top 32 moves downwardly against the bias of coil spring 34 to reside in its lower position totally received within plunger top axial bore 30. This movement is illustrated in FIG. 2c. Thus, push rod 40 must travel the distance indicated by "x" in FIG. 2 before any injection takes place. Distance "x" is the sum of the distance between upper piston 36 and lower piston 38 (the length of timing chamber 42) and the distance plunger top 32 extends above the top surface of plunger 20. After push rod 40 travels distance x, upper piston 36, lower piston 40, and plunger 20 operate in unison as a one piece plunger. Farther downward movement of push rod 40 translates plunger 20 within axial plunger bore 14 to inject fuel through injection nozzle 16. Preferably, as plunger 20 begins its downward movement, fuel metering is shut off and the fuel pressure of the fuel in the injection chamber 17 increases to force fuel through injection nozzle 16 thereby permitting fuel to enter the engine cylinders. Injection terminates when plunger 20 reaches the bottom of injection chamber 17 at the bottom of axial plunger bore 14.

Figure 3:
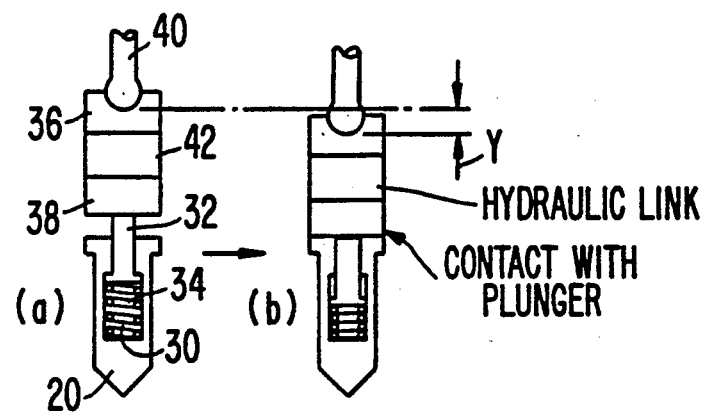
FIGS. 3a and 3b are schematic views of the fuel injector of FIG. 1 illustrating the first advanced timing mode.

FIGS. 3a and 3b illustrate the operation of the fuel injector during a first advanced timing mode. In this mode, as fuel is metered into injection chamber 17, timing fluid is metered into timing chamber 42 through timing fluid inlet 52, upper piston passageway 48, and timing chamber fluid inlet 44. Timing fluid fills timing chamber 42, as shown in FIG. 3a, with timing fluid having a fluid pressure less than the pressure required to move plunger 32 downwardly against the bias of coil spring 34. The timing fluid is substantially incompressible and provides a hydraulic link between upper piston 36 and lower piston 38. As the cam follower of the actuating mechanism rises, push rod 40 moves downwardly, and upper piston 36 and lower piston 38 concurrently move downwardly the same distance. As upper piston 36 move downwardly it blocks timing fluid inlet 52 from further communication with upper piston passageway 48. As lower piston 30 moves downwardly it pushes plunger top 32 downwardly against the bias of coil spring 34 until plunger top 32 is disposed in its lower position within plunger top axial bore 30, as shown in FIG. 3b. Only after 32 has traveled the required distance to have its top surface substantially coplanar with the top of plunger 20 does fuel injection into the cylinders of the engine begin. In this mode, push rod 40 travels the distance indicated by "y" in FIG. 3 before injection occurs. Y is the distance plunger top 32 extends above the top surface of plunger 20. At the end of this cycle, lower piston passageway 50 registers with timing fluid outlet 54 and a check valve (not shown), if used, opens timing fluid outlet 54. Timing fluid is then spilled from timing chamber 42 through timing chamber fluid outlet 46, lower piston passageway 50, and timing fluid outlet 54.

Figure 4:
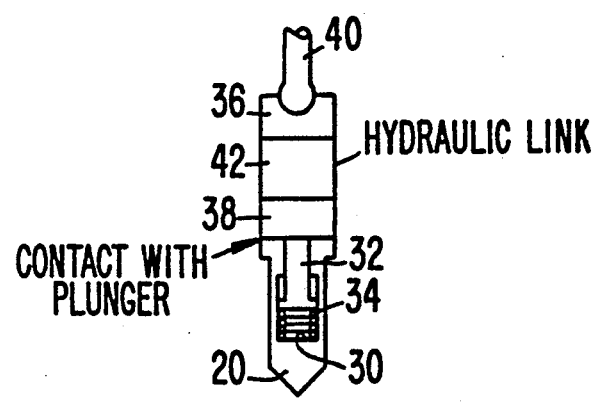
FIG. 4 is a schematic view of the fuel injector of FIG. 1 illustrating the second advanced timing mode.

The operation of the fuel injector in a second advanced timing mode is illustrated in FIG. 4. This mode is initially similar to the first advanced timing mode. As fuel is metered into injection chamber 17, timing fluid is metered into timing chamber 42. Unlike the first mode, during the second mode timing fluid is caused to fill timing chamber 42 at a pressure greater than the pressure exerted on plunger 32 by coil spring 34. As a result, plunger 32 moves downwardly.

The timing fluid provides a hydraulic link between upper piston 36 and lower piston 38. Thus, as push rod 40 moves downwardly, upper piston 36 and lower piston 38 move downwardly. Additionally, in this mode, because the fluid pressure of timing fluid in fluid chamber 42 exceeds the pressure required to compress coil spring 34, lower piston 38 moves plunger top 32 downwardly at least part of the distance to its lower position before push rod 40 begins its downward motion. The injection timing is therefore advanced beyond that of the first advanced timing mode an amount corresponding to the distance plunger top 32 moves under the influence of the timing fluid pressure. Where the timing fluid pressure is at a maximum pressure predetermined to overcome the force of coil spring 34 and to move plunger 32 totally to its lower position within plunger top axial bore 30, the injection timing is fully advanced shown in FIG. 4. In this mode, upper piston 36, lower piston 38, and plunger 20 act as a unitary plunger from the beginning of the downward motion of push rod 40. Thus, injection begins at cam rise.

Within the second advanced timing mode, the fuel injector can operate either as a stepped advanced timing injector or as an infinitely variable timing injector. If the injector operates as a stepped advanced timing injector, plunger top 32 will not move downwardly unless the pressure of the timing fluid is sufficient to move it to its lowermost position. In this mode the injector is a three step injector, operating either normally (no timing fluid), in a first advanced position (timing chamber filled, plunger top 32 in upper position), or in a fully advanced position (timing chamber filled, plunger 32 in lower position). Alternately, the injector can operate as an infinitely variable injector during its second advanced timing mode in which plunger top 32 may be translated any distance within plunger top axial bore 30 between its upper and lower position depending on the fluid pressure of the timing fluid. The injector is not infinitely variable during its first advanced timing mode. That portion of the operation of injector 10 is always an all-or-nothing stepped advance.

Therefore, when the timing chamber is empty of timing fluid the fuel injector operates with normal timing. When the timing chamber contains timing fluid at less than the threshold pressure required to overcome the force of coil spring 34, the fluid serves as a hydraulic link between the upper and lower pistons to operate the injector at a stepped-up advanced timing. When the timing fluid in the the timing chamber exceeds the threshold pressure the injector operates at a still more advanced timing. When the fluid pressure totally overcomes the force of coil spring 34 the injector operates in a fully advanced timing mode.

FIG. 5 graphically illustrates a comparison of the relative travel of plunger 20 vs. cam angle for all three modes of operation of the injector. The shaded area indicates advanced operation within the infinitely variable range of the second advanced timing mode.

INDUSTRIAL APPLICABILITY

The fuel injector of the present invention is able to achieve either a three step or a two part infinitely variable timing of fuel injection using a relatively simple and easily manufactured injector. This injector finds application in a large variety of internal combustion engines, especially compression ignition engines used in over-the-road vehicles or in stationary power plants.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing form the scope or spirit of the invention.

We claim:

1. A fuel injector having variable timing comprising:
   an injector housing having an axial plunger bore with an injection nozzle at one end for discharging fuel from said axial plunger bore and a plunger receiving opening at the other end;
   an injector plunger mounted for successive cycles of reciprocating movement within said axial plunger bore of said housing and translatable between a retracted position and an inserted position;
   plunger biasing means for biasing said plunger in said retracted position;
   a timing chamber which receives timing fluid at variable pressures; and
   timing means disposed within said injector housing and adjacent said timing chamber for advancing the timing of said fuel injector, wherein when said timing chamber is empty of timing fluid said timing means operates said fuel injector with normal timing, and when said timing chamber contains timing fluid said fuel injector operates with advanced timing, when the fluid has a fluid pressure less than a predetermined value said timing means operates said fuel injector at a first level of advanced timing, and when the timing fluid has a fluid pressure greater than a predetermined value said timing means operates said fuel injector at a second level of advanced timing, and wherein said second level is more advanced than said first level;
   wherein the advancement of fuel injection during said first level is incremental and the advancement of fuel injection during said second level is infinitely variable within a range between the advancement in said first level and the maximum advancement in said second level.

2. A fuel injector according to claim 1 wherein said timing means comprises an upper piston and a lower piston and said timing chamber is formed between said upper piston and said lower piston, each said piston being independently translatable within said injector housing wherein said timing chamber is adapted to receive timing fluid to form a hydraulic link between said upper and lower pistons.

3. A fuel injector according to claim 2 wherein said upper piston is directly connected to a push rod which transmits translational motion to said injector plunger.

4. A fuel injector according claim 2 wherein said timing chamber comprises timing chamber biasing means for biasing said upper piston apart from said lower piston.

5. A fuel injector having variable timing comprising:
   an injector housing having an axial plunger bore with an injection nozzle at one end for discharging fuel from said axial plunger bore and a plunger receiving opening at the other end;
   an injector plunger mounted for successive cycles of reciprocating movement within said axial plunger bore of said housing and translatable between a retracted position and an inserted position;
   plunger biasing means for biasing said plunger in said retracted position;
   a timing chamber which receives timing fluid at variable pressures; and
   timing means disposed within said injector housing and adjacent said timing chamber for advancing the timing of said fuel injector, wherein when said timing chamber is empty of timing fluid said timing means operates said fuel injector with normal timing, and when said timing chamber contains timing fluid said fuel injector operates with advanced timing, when the fluid has a fluid pressure less than a predetermined value said timing means operates said fuel injector at a first level of advanced timing, and when the timing fluid has a fluid pressure greater than a predetermined value said timing means operates said fuel injector at a second level of advanced timing, and wherein said second level is more advanced than said first level;
   wherein said timing means comprises an upper piston and a lower piston and said timing chamber is formed between said upper piston and said lower piston, each said piston being independently translatable within said injector housing wherein said timing chamber is adapted to receive timing fluid to form a hydraulic link between said upper and lower pistons, wherein said injector housing has a first fluid outlet and said timing chamber has a second fluid outlet and said first and second fluid outlets communicate with each other by a passageway disposed through said lower piston.

6. A fuel injector according to claim 5 wherein said lower piston passageway includes a valve which pressurizes the fluid, controls fluid flow, and prevents back flow.

7. A fuel injector according to claim 6 wherein said lower piston passageway valve comprises a spring-biased ball valve.

8. A fuel injector according to claim 2 wherein said injector housing has a first fluid inlet and said timing chamber has a second fluid inlet and said first and second fluid inlets communicate with each other by a passageway disposed through said upper piston.

9. A fuel injector according to claim 8 wherein said upper piston passageway comprises a valve which pressurizes the fluid, controls the fluid flow, and prevents back flow.

10. A fuel injector according to claim 9 wherein said upper piston passageway valve comprises a spring-biased ball valve.

11. A fuel injector according to claim 5 wherein said injector housing has a first fluid inlet and said timing chamber has a second fluid inlet and said first and second fluid inlets communicate with each other by a passageway disposed through said upper piston.

12. A fuel injector according to claim 11 wherein the advancement of fuel injection during said first level of advanced timing is incremental and the advancement of fuel injection during said second level of advanced timing is infinitely variable within a range between the advancement in said first level and the maximum advancement in said second level.

13. A fuel injector according to claim 2 wherein said timing means further comprises a plunger top mounted within an axial bore formed in the top of said plunger and translatable between an upper position in which said plunger top extends out of said axial bore and a lower position in which said plunger top is disposed within said axial bore such that the top surface of said plunger top is substantially coplanar with the top surface of said plunger.

14. A fuel injector according to claim 13 wherein said timing means further comprises plunger top biasing means disposed in said axial bore of said plunger for biasing said plunger top toward said upper position, wherein when the timing fluid creates a force on said second piston less than the force created by said plunger top biasing means said fuel injector is operated in a first level of advanced timing, and when the timing fluid creates a force on said second piston greater than the force created by said plunger top biasing means said lower piston contacts and pushes downwardly said plunger top toward said lower position to operate said fuel injector in a second level of advanced timing.

15. A fuel injector according to claim 14 wherein said plunger top biasing means comprises a coil spring.

16. A fuel injector according to claim 14 wherein said injector housing has a first fluid inlet and a first fluid outlet, said timing chamber has a second fluid inlet and a second fluid outlet, said upper and lower pistons each have a passageway said first and second fluid inlets communicate through said upper piston passageway, and said first and second fluid outlets communicate through said lower piston passageway.

17. A fuel injector according to claim 16 wherein the advancement of fuel injection during said first level of advanced timing is incremental and the advancement of fuel injection during said second level of advanced timing is infinitely variable within a range between the advancement in said first level and the maximum advancement in said second level.

18. A fuel injector according to claim 16 wherein said upper piston passageway and said lower piston passageway each comprises a spring-biased ball valve to control fluid flow.

19. A fuel injector having variable timing comprising:

an injector housing having an axial plunger bore with an injection nozzle at one end for discharging fuel from said axial plunger bore, a plunger receiving opening at the other end, a first fluid inlet, and a first fluid outlet;

an injector plunger mounted for successive cycles of reciprocating movement within said axial plunger bore of said housing and translatable between a retracted position and an inserted position, said plunger comprising a plunger top axial bore formed in the top of said plunger, a plunger top mounted within said plunger top axial bore and translatable between an upper position in which said plunger top extends out of said plunger top axial bore and a lower position in which said plunger top is disposed within said plunger top axial bore such that the top surface of said plunger top is substantially coplanar with the top surface of said plunger, and a coil spring disposed in said plunger top axial bore for biasing said plunger top in said upper position;

plunger biasing means for biasing said plunger in said retracted position;

a lower piston disposed above said plunger within said injector housing, and having a lower piston passageway and a spring-biased ball valve which controls fluid flow;

an upper piston disposed above said lower piston within said injector housing and having an upper piston passageway and a spring-biased ball valve which controls fluid flow; and a timing chamber formed within said injector housing between said upper piston and said lower piston, said timing chamber comprising timing chamber biasing means for biasing said upper piston away from said lower piston and having a second fluid inlet and a second fluid outlet, said first and second fluid inlets communicating with each other through said upper piston passageway and said first and second fluid outlets communicating with each other through said lower piston passageway, wherein when said timing chamber is empty of timing fluid said fuel injector operates with normal timing, when said timing chamber contains timing fluid the fluid serves as a hydraulic link between said upper and lower pistons and said fuel injector operates with advanced timing, when the timing fluid creates a force on said lower piston which is less than the force created by said coil spring said fuel injector is operated at a first level of advanced timing, and when the fluid creates a force on said lower piston which is greater than the force created by said coil spring said lower piston contacts and pushes downwardly said plunger top toward said lower position to operate said fuel injector at a second level of advanced timing, wherein said second level is more advanced than said first level and the advancement of fuel injection during said second level is infinitely variable within the range set by said upper and lower positions of said plunger top within said plunger top axial bore.

20. A fuel injector having variable timing comprising:

an injector housing having an axial plunger bore with an injection nozzle at one end for discharging fuel from said axial plunger bore and a plunger receiving opening at the other end;

an injector plunger mounted for successive cycles of reciprocating movement within said axial plunger bore of said housing and translatable between a retracted position and an inserted position;

plunger biasing means for biasing said plunger in said retracted position;

a timing chamber which receives timing fluid at variable pressures; and timing means disposed within said injector housing and adjacent said timing chamber for advancing the timing of said fuel injector, wherein when said timing chamber is empty of timing fluid, said timing means operates said fuel injector with normal timing, and when said timing chamber contains timing fluid said fuel injector operates with advanced timing, when the fluid has a fluid pressure less than a predetermined value said timing means operates said fuel injector at a first level of advanced timing, and when the timing fluid has a fluid pressure greater than a predetermined value said timing means operates said fuel injector at a second level of advanced timing, and wherein said second level is more advanced than said first level, said timing means including a plunger top mounted within an axial bore formed in the top of said plunger and plunger top biasing means biasing said plunger top to extend outwardly from said axial bore, wherein in said first level of advanced timing downward movement of a fuel injector actuator initially causes downward movement of said plunger top while said injector plunger remains substantially in the retracted position, and further movement of said actuator causes movement of said plunger from said retracted position toward said inserted position.

21. The fuel injector of claim 20 wherein when said timing means operates said fuel injector at said second level of advanced timing, initial downward movement of said actuator causes movement of said plunger from said retracted position toward said inserted position.

* * * * *